United States Patent
Rusek, Jr. et al.

(10) Patent No.: US 11,300,315 B2
(45) Date of Patent: Apr. 12, 2022

(54) RADIAL COMPRESSION PACKAGING OF A FLEXIBLE DUCT

(71) Applicant: Quietflex Manufacturing Co., LP, Houston, TX (US)

(72) Inventors: Stanley Rusek, Jr., The Woodlands, TX (US); Darrin L. Affeldt, Katy, TX (US)

(73) Assignee: Quietflex Manufacturing Co., LP, Houston, TX (US)

( * ) Notice: Subject to any disclaimer, the term of this patent is extended or adjusted under 35 U.S.C. 154(b) by 51 days.

(21) Appl. No.: 16/891,123

(22) Filed: Jun. 3, 2020

(65) Prior Publication Data

US 2020/0386438 A1    Dec. 10, 2020

Related U.S. Application Data

(60) Provisional application No. 62/858,954, filed on Jun. 7, 2019.

(51) Int. Cl.
*F24F 13/02* (2006.01)
*F16L 7/00* (2006.01)

(52) U.S. Cl.
CPC ............ *F24F 13/0218* (2013.01); *F16L 7/00* (2013.01); *F24F 13/0245* (2013.01); *F24F 13/0281* (2013.01)

(58) Field of Classification Search
CPC .............. F24F 13/0218; F24F 13/0245; F24F 13/0281; F16L 7/00
USPC ........................................................ 138/119
See application file for complete search history.

(56) References Cited

U.S. PATENT DOCUMENTS

| | | | | |
|---|---|---|---|---|
| 4,307,701 A | * | 12/1981 | Balon | F24H 3/0488 126/110 B |
| 5,368,341 A | * | 11/1994 | Larson | B64F 1/362 138/119 |
| 5,607,107 A | * | 3/1997 | Grieve | E02B 11/005 137/355.23 |
| 9,052,054 B2 | * | 6/2015 | Nobileau | E21B 19/22 |
| 9,528,264 B2 | * | 12/2016 | Freebury | B32B 5/26 |
| 9,863,148 B2 | * | 1/2018 | Fernandez | B29C 65/48 |
| 10,080,858 B2 | * | 9/2018 | Chodkowski | A61M 16/0875 |
| 10,792,452 B2 | * | 10/2020 | Henry | A61M 16/0875 |
| 2007/0054082 A1 | * | 3/2007 | Beyer | B65D 71/0096 428/43 |
| 2014/0261701 A1 | * | 9/2014 | Deutsch | F24F 13/0272 137/1 |
| 2015/0152984 A1 | * | 6/2015 | Disbrow | F16L 11/085 138/119 |
| 2017/0038091 A1 | * | 2/2017 | Campbell | F24F 13/0263 |
| 2018/0106486 A1 | * | 4/2018 | Caskey | F24F 13/0245 |

\* cited by examiner

*Primary Examiner* — Craig M Schneider
*Assistant Examiner* — David R Deal
(74) *Attorney, Agent, or Firm* — Chamberlain Hrdlicka

(57) ABSTRACT

A system for packing and assembling a flexible duct that includes a sleeve. The sleeve includes a tubular vapor barrier and an insulating layer within the vapor barrier and includes a central cavity. Further, the sleeve is radially compressed and rolled along an axial direction. The system also includes an air core sized to fit within the central cavity of the insulating layer. The air core includes a sheet that blocks fluid flow therethrough and a structural support coiled within the sheet and the air core is flattenable and not within the rolled sleeve.

18 Claims, 13 Drawing Sheets

RADIAL COMPRESSION PACKAGING OF A FLEXIBLE DUCT

BACKGROUND

Heating, ventilation, and air conditioning ("HVAC") systems utilize flexible ducting to carry air throughout a structure in which the HVAC system is installed. As such, a single HVAC system may utilize hundreds of feet of flexible ducting. Further, the flexible ducting is inexpensive per unit volume for the entire HVAC system. Thus, costs relating to storage and shipment of flexible ducting comprise a large portion of the total cost. Currently, flexible ducting is fully assembled, then compressed axially for shipping, and sent to a destination where the flexible ducting is decompressed and incorporated into an HVAC system. However, the amount of axial compression is limited by components of the flexible ducting that can be damaged if axially compressed too much.

BRIEF DESCRIPTION OF THE DRAWINGS

Embodiments of the radial compression packaging of a flexible duct are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
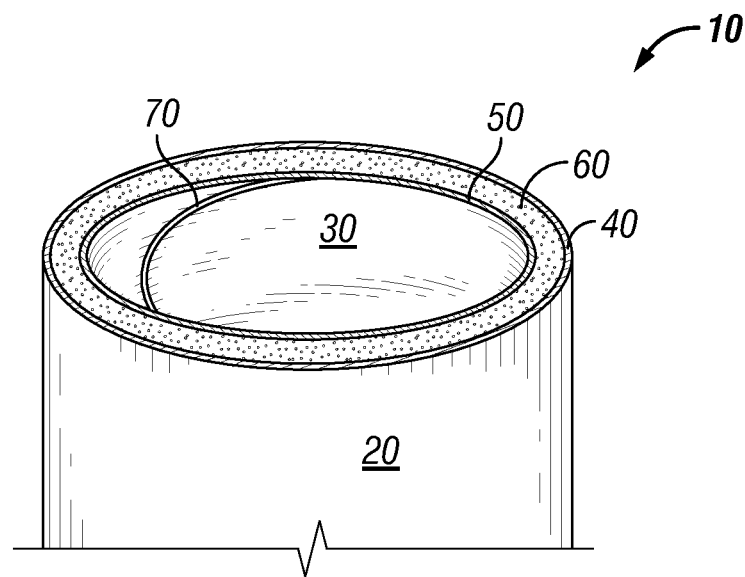
FIG. 1 illustrates a cut-away view of a flexible duct.

FIG. 1 illustrates a cut-away view of a flexible duct 10 for use in heating, ventilation, and air conditioning ("HVAC") systems to carry air as it flows through the HVAC system. As such, the flexible duct 10 often occupies the most volume of an HVAC system and hundreds of linear feet of flexible duct 10 can be used in HVAC systems. To carry air, the flexible duct 10 includes a tubular-shaped body 20 with a central cavity 30 through which the air flows. Typically, the air flowing within the central cavity 30 is at a different temperature than the environment surrounding the flexible duct 10. As such, the body 20 includes three layers to prevent the air from leaking out of the central cavity 30 and to reduce thermal interactions between the air in the central cavity 30 and the surrounding environment. The resistance to the transfer of heat across the flexible duct 10 due to the temperature differential is typically referred to as the R value of the flexible duct 10. Flexible ducts 10 typically have an R value of R-4.2, R-6.0, R-8.0, R-12.0, or R-13.0, where the higher R values correspond to a higher resistance to heat transfer.

The three layers of the body 20 include a vapor barrier 40, an insulating layer 60, and an air core 50. The vapor barrier 40 is the radially outer layer and is a tubular sheet that fluidly isolates the other layers from the surrounding environment. The air core 50 is the radially inner layer and includes a structural support 70 within a tubular sheet that fluidly isolates the other layers from the central cavity 30. The insulating layer 60 is radially between the vapor barrier 40 and the air core 50 and reduces thermal interaction, and thus heat transfer rates, between air in the central cavity 30 and the surrounding environment. Moisture tends to collect on the surface of the flexible duct 10 due to condensation caused by the temperature difference between the central cavity 30 and the surrounding environment. Moisture flowing into the insulating layer 60 reduces the insulating effects of the insulating layer 60, thereby allowing more heat transfer between the central cavity 30 and the surrounding environment. Further, moisture tends to decrease the lifespan of the insulating layer 60. The insulating layer 60 also includes a fibrous material, such as glass fibers, which tend to absorb and trap moisture, thereby exacerbating the above issues. The fluid barrier provided by the vapor barrier 40 and the air core 50 blocks fluids, particularly the moisture, from contacting the insulating layer 60.

When placed within an HVAC system, the flexible duct 10 is sometimes positioned to change directions along its axial length. For example, the flexible duct 10 can be bent to carry air around corners and/or obstacles. Further, maintaining the cross-sectional area of the central cavity 30 provides a more consistent flow path with fewer pressure variations. The air core 50 includes the structural support 70 within the tubular sheet that provides structural rigidity to the flexible duct 10 to maintain the cross-sectional area of the central cavity while also maintaining the flexibility of the flexible duct 10. The structural support 70, for example, may be a solid, such as a metal, wound into an elongated spring within the tubular sheet.

Figure 2A:
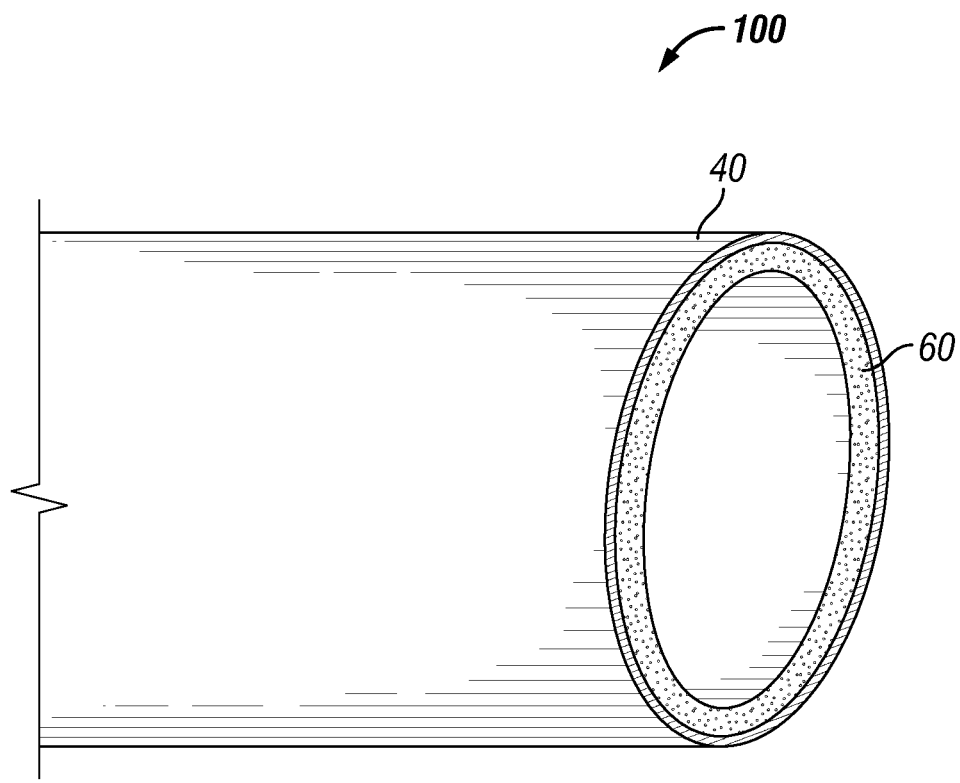
FIG. 2A illustrates a cut-away view of a sleeve of a flexible duct.
Figure 2B:
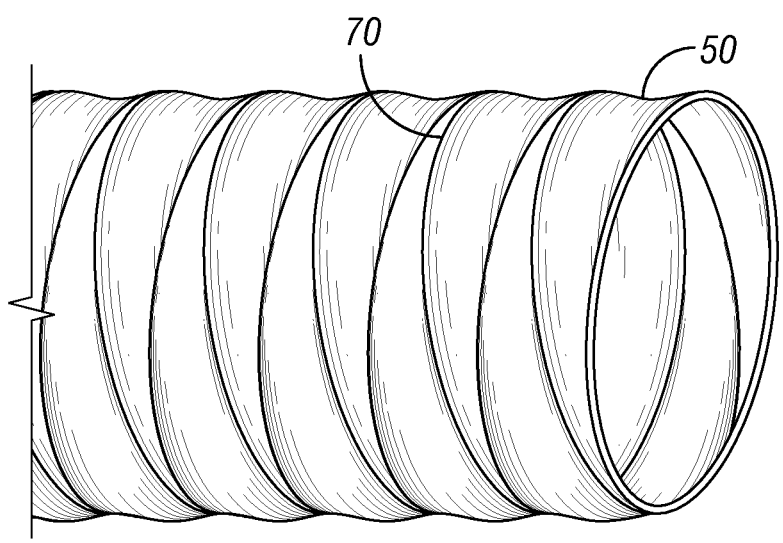
FIG. 2B illustrates a cut-away view of an air core of a flexible duct.

During the manufacture of the flexible duct 10, the insulating layer 60 is placed inside the vapor barrier 40 to form a sleeve 100, as illustrated in FIG. 2A. Without the structural support 70 provided by the air core 50, the sleeve 100 is flexible and can be radially compressed. The air core 50 is formed separately from the vapor barrier 40 and insulating layer 60, as illustrated in FIG. 2B. The air core 50 is not as flexible as the sleeve 100 due to the rigidity of the structural support 70. As such, the sleeve 100 and the air core 50 are not assembled together to form the flexible duct 10 prior to packaging, as described in detail below.

Figure 3:
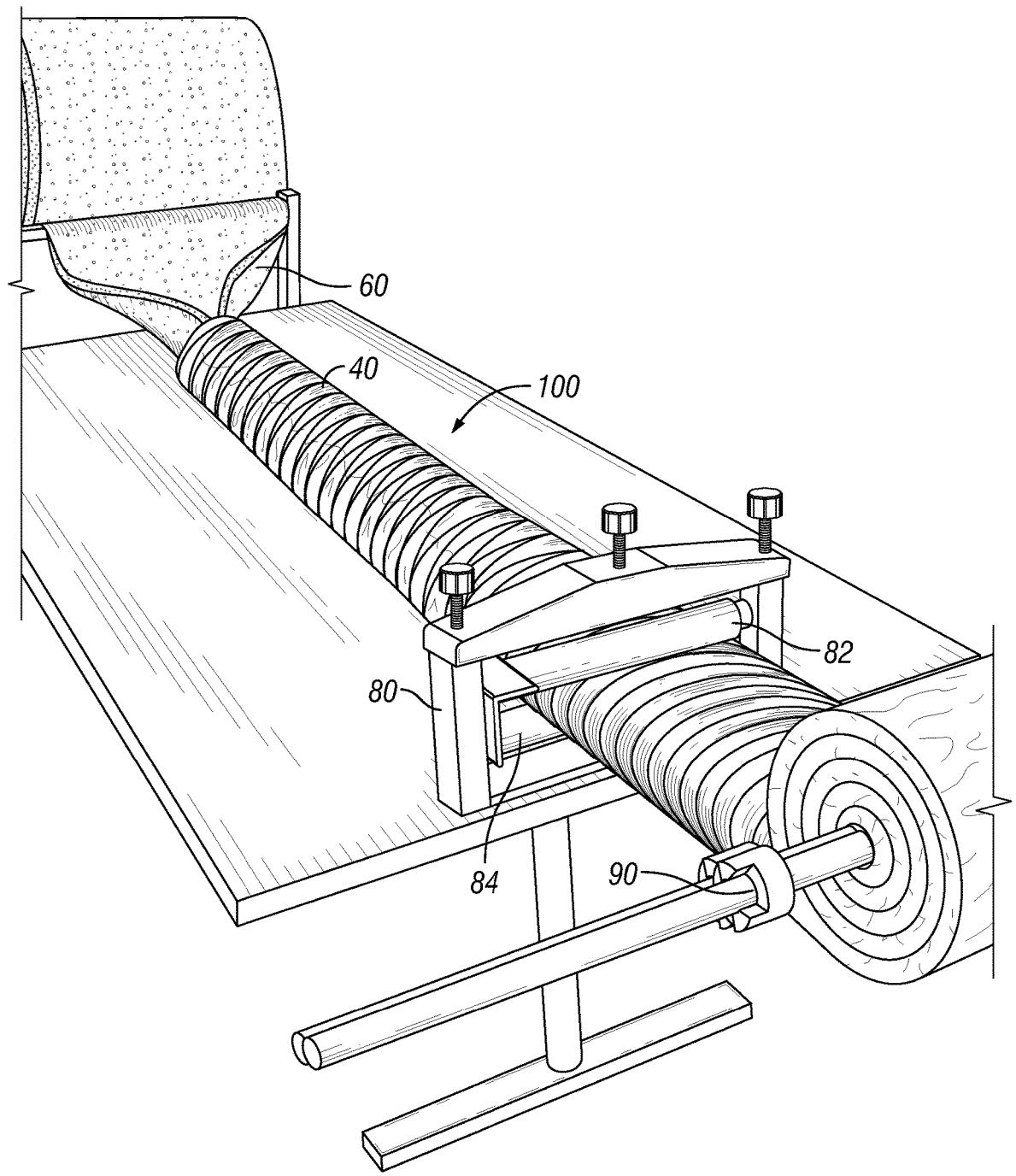
FIG. 3 illustrates a perspective view of the sleeve being radially compressed and rolled.

FIG. 3 illustrates the sleeve 100 being formed, radially compressed, and rolled. The vapor barrier 40 and the insulating layer 60 are formed into the sleeve 100 at a formation point 78. The sleeve 100 is then inserted into a compression device 80 that radially compresses the sleeve 100. For example, the compression device 80 may include a pair of rollers 82, 84 that rotate as the sleeve 100 passes between the rollers 82, 84. The space between the rollers 82, 84 dictates the degree of compression of the sleeve 100. For example, the closer the rollers 82, 84 are to one another, the greater the degree of compression. As the sleeve 100 passes through the compression device, air from within the central cavity of the sleeve 100 and air from within the insulating layer 60 is pushed out of the sleeve 100. After the sleeve 100 passes through the compression device 80, the sleeve 100 is rolled onto a spool 90, which further compresses the sleeve 100, thereby pushing additional air within the central cavity of the sleeve 100 and air from within the insulating layer 60 out of the sleeve 100. Further, rolling the sleeve 100 around the spool 90 causes the sleeve 100 to form a cylinder, which reduces the volume of the sleeve 100. Before the entire sleeve 100 is formed, the air core 50 is flattened and inserted into the sleeve 100 for shipping purposes, as described below.

Figure 4A:
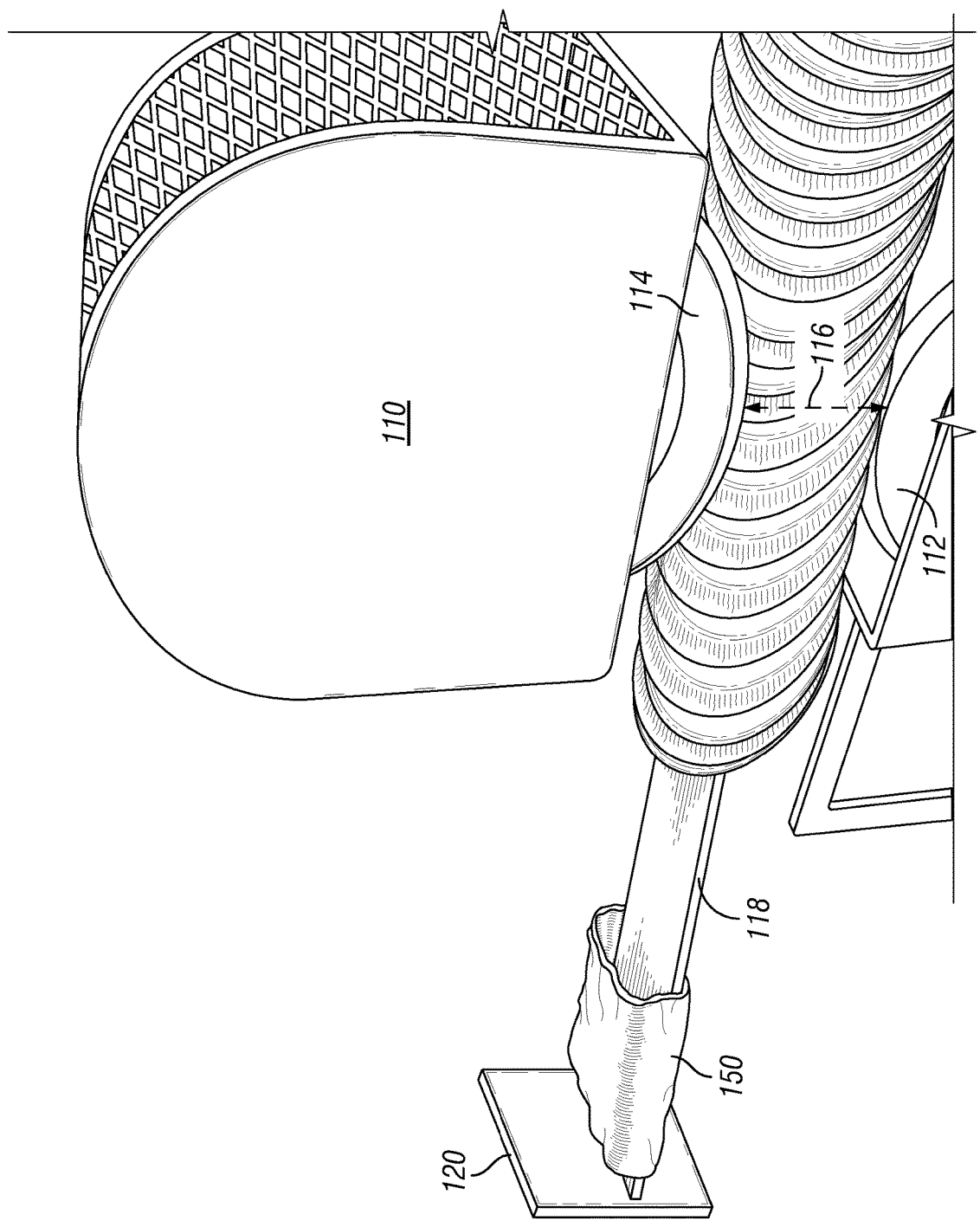
FIG. 4A illustrates a perspective view of the air core being flattened.

FIG. 4A illustrates a perspective view of the air core 50 being flattened. It should be appreciated that, in this context, flattening the air core 50 means that the structural support 70 collapses onto itself such that the diameter of the air core 50 along one plane containing the central axis of the air core 50 remains roughly the same while the diameter of the air core 50 along all other planes is reduced. A core cruncher 110 is utilized to flatten the air core 50. The core cruncher 110 includes a pair of rollers, a fixed roller 112 and a rotating roller 114, and a plate 118 extending from a stop 120. The rollers 112, 114 are spaced from one another to form a passage 116 through which the air core 50 can pass.

Figure 4B:
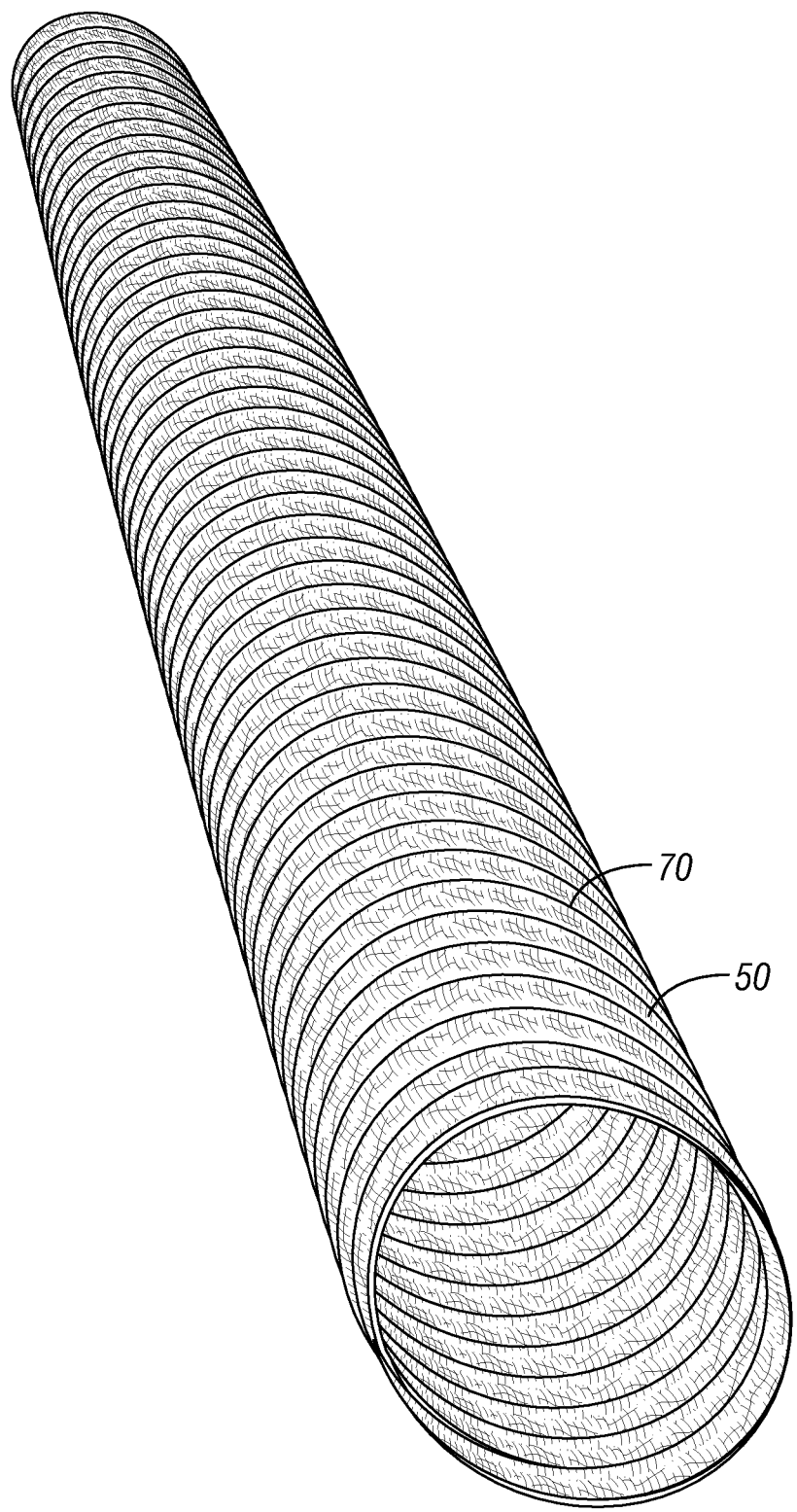
FIG. 4B illustrates a perspective view of the fully flattened air core.

In operation, a shuttle bag 150 is loaded onto the plate 118 to receive the air core 50 after the air core 50 is flattened. At this time, the shuttle bag 150 is open on both ends so that it can be loaded onto the plate 118. With the shuttle bag 150 in place, the air core 50 is then ready to be flattened. A portion of the air core 50 is placed within the passage 116. Then, the rotating roller 114 is powered on and rotated. The rotation of the rotating roller 114 pulls the air core 50 through the passage 116. As the air core 50 passes through the passage 116, the difference between the rotation of the rotating roller 114 and the non-movement of the fixed roller 112 causes the structural support 70 to collapse into a flattened position without damaging the structural support. In other words, the rollers 112,114 cause an elastic deformation of the structural support 70 rather than a plastic deformation. Further, as the air core 50 is flattened, the air core 50 is also loaded onto the plate 118. After the full length of the air core 50 passes through the rollers 112,114 the air core 50 is fully flattened, as illustrated in FIG. 4B, thereby reducing the volume and the length of the air core 50.

Figure 5:
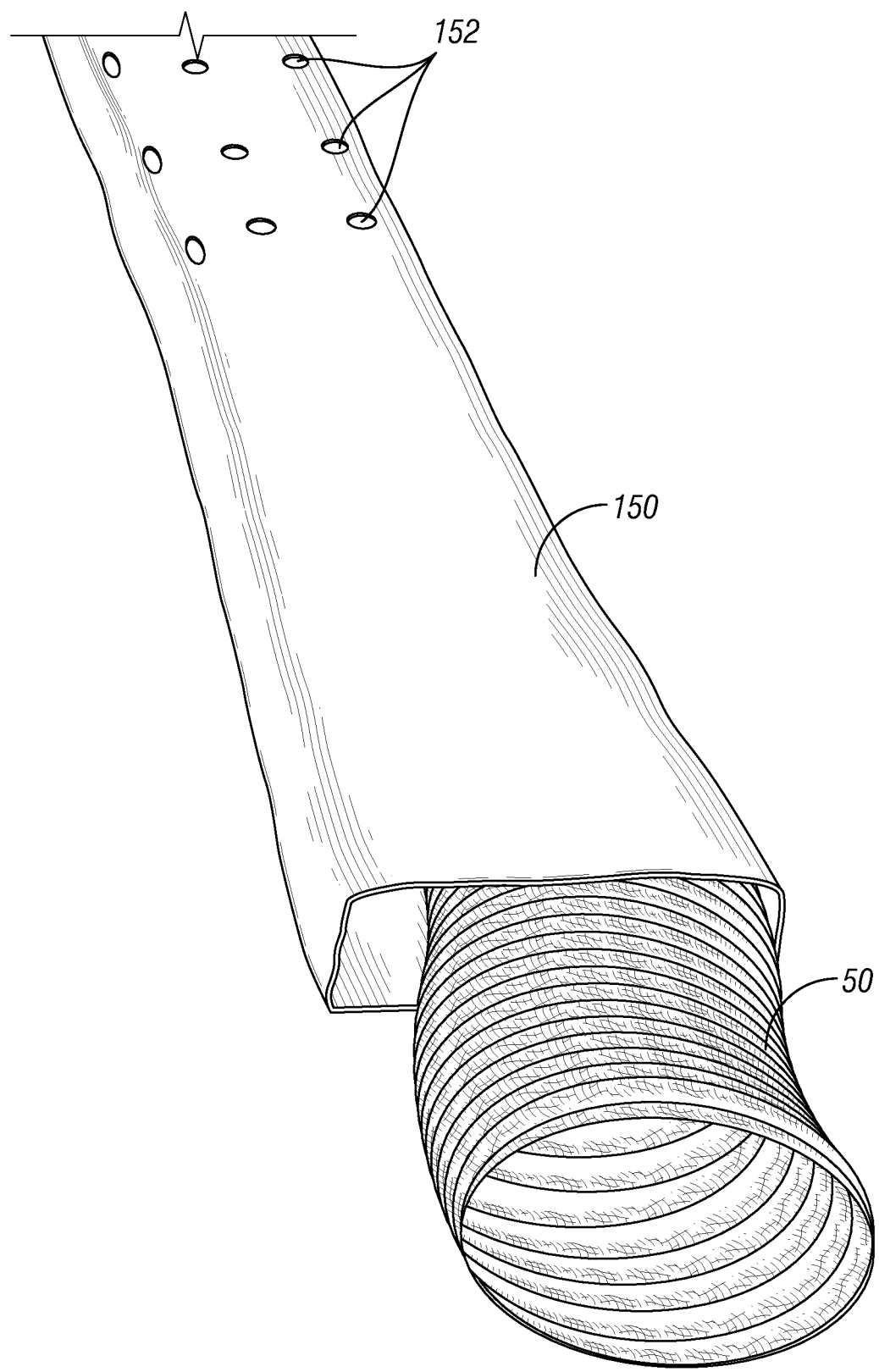
FIG. 5 illustrates a perspective view of the flattened air core within an shuttle bag.

After the air core 50 is fully flattened and is loaded onto the plate 118 alongside the shuttle bag 150, the shuttle bag 150 can be pulled over the air core 50 such that the air core is fully contained within the shuttle bag 150, as illustrated in FIG. 5.

As shown in FIG. 5, the shuttle bag 150 includes holes 152 through the shuttle bag 150 to allow air to flow in or out of the shuttle bag 150. Further, after the air core 50 is inserted into the shuttle bag 150, one end of the shuttle bag is closed, such as by heat sealing or taping. Next, the shuttle bag 150, with the air core 50 inside is removed from the plate 118 and the second end of the shuttle bag 150 is closed, such as by heat sealing or taping.

Figure 6:
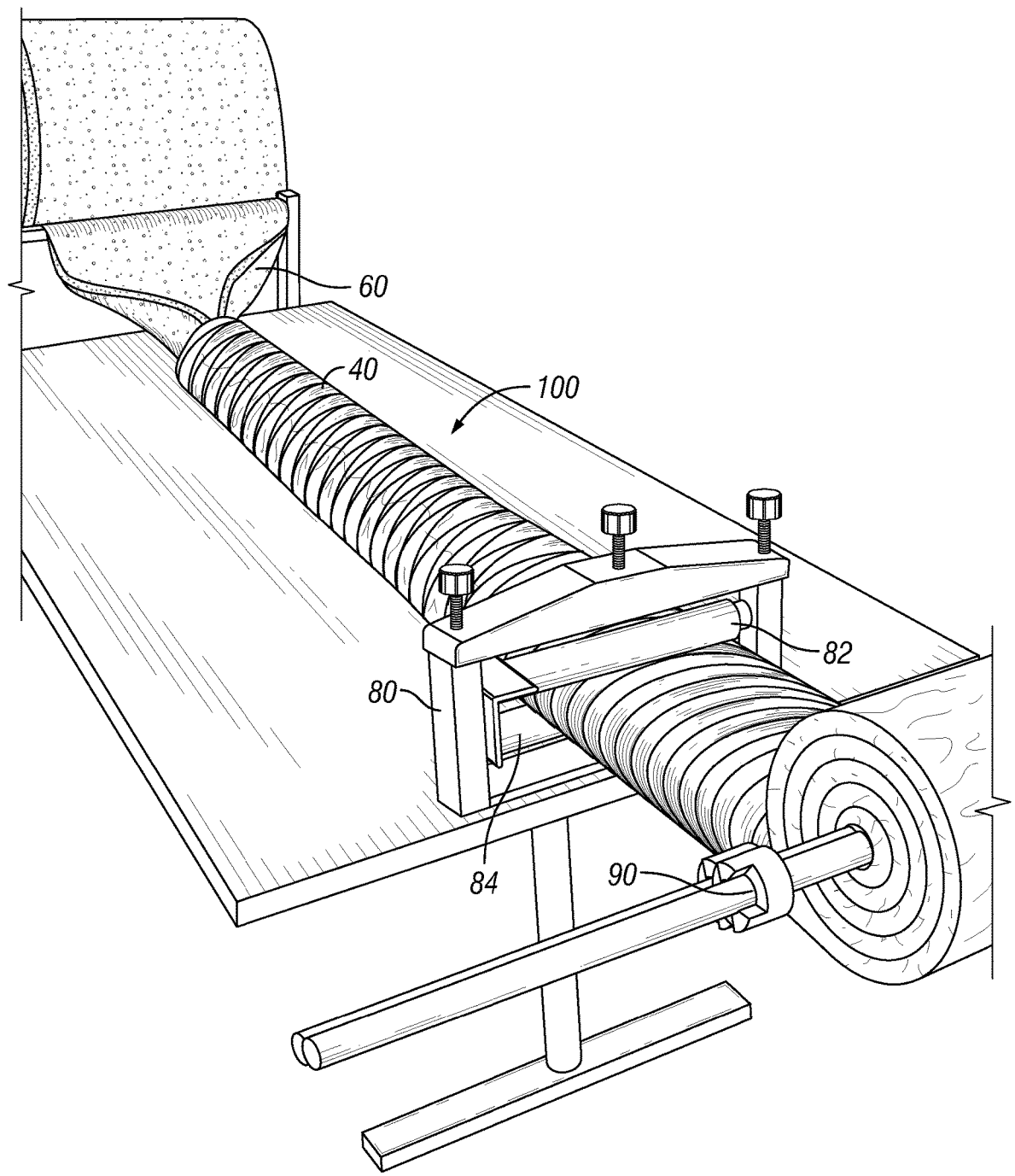
FIG. 6 illustrates the flattened air core within the shuttle bag being rolled within the sleeve.

With the shuttle bag 150 closed on both ends, the shuttle bag 150 is then placed within the insulating layer 60 that has yet to be formed into the sleeve 100, as illustrated in FIG. 6, which also illustrates the formation of the sleeve 100, as discussed above. After the shuttle bag 150 is placed within the insulating layer 60, the formation of the sleeve 100 is continued until completion with the shuttle bag 150 and the enclosed flattened air core 50 within the sleeve 100. The rest of the sleeve 100, with the shuttle bag 150 positioned therein, then passes through the compression device 80 and is rolled onto the spool 90. The holes 152 allow air to escape the shuttle bag 150 when passing through the compression device 80 and rolling on the spool 90 so that the shuttle bag 150 and air core can be compressed along with the sleeve 100. When completed, the end of the shuttle bag 150 is at or near the end of the sleeve 100. In this instance, near is used to denote within one foot. The air core 50 being positioned within both the shuttle bag 150 and the sleeve 100 provides additional protection for the air core 50 during shipping.

Figure 8:
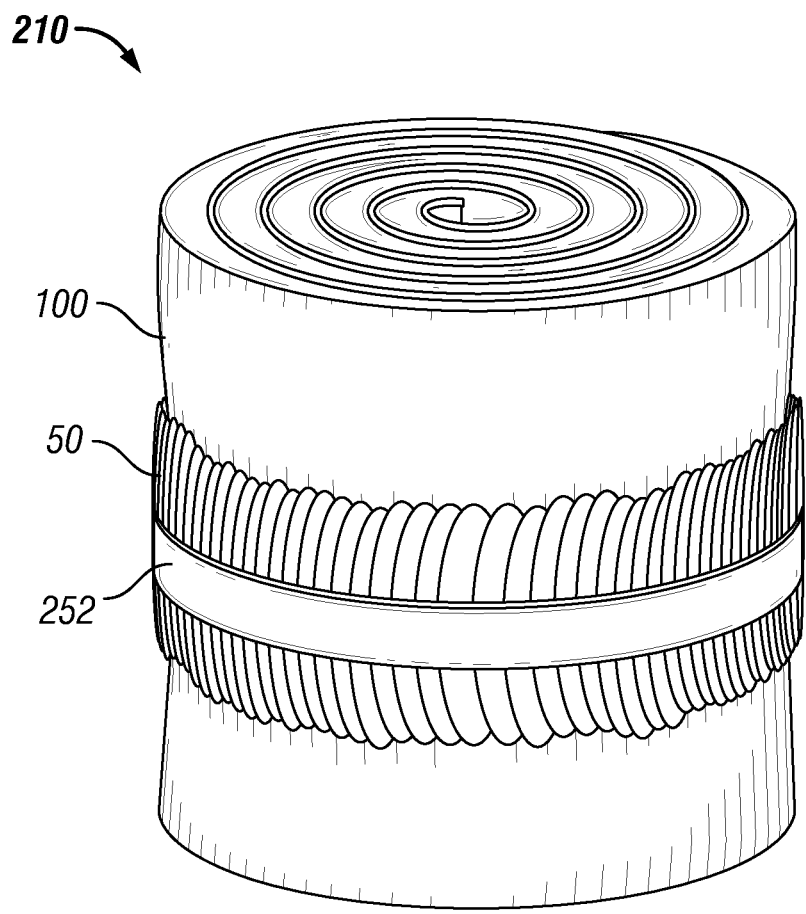
FIG. 8 illustrates a perspective view of the compressed sleeve rolled up and packaged for shipment with the flattened air core placed around the roll.

In an alternative embodiment, a flattened air core 50 is left out of a rolled and compressed sleeve 100, as illustrated in FIG. 8. For example, FIG. 8 illustrates a packaged compressed flexible duct 210 that includes a sleeve 100, the flattened air core 50, and a securing mechanism 252. The sleeve 100 is axially compressed and rolled into a cylinder, as also illustrated in FIG. 3. However, the formation of the sleeve 100 is completed while leaving the air core 50 outside of the sleeve 100. Instead, the flattened air core 50 is wrapped around the sleeve 100. The securing mechanism 252 secures the air core 50 to the sleeve 100, and the securing mechanism 252 can include an elastic band, a string that can form a knot, or a heat-shrinking polymer. This configuration includes every component of the flexible duct 210, but in a partially assembled state.

Alternatively, the flattened air core 50 is not wrapped around the sleeve 100. Instead, the flattened air core 50 can be kept separate from the sleeve 100. For example, the flattened air core 50 can remain flat and be packaged in a separate part of the shipping container.

The packaged compressed flexible duct 210 occupies a smaller volume than a fully assembled flexible duct that is axially compressed, thereby enabling more flexible duct to be packed into the same volume. For example, 20% to 100% more flexible duct can be packed into a standard shipping container using the packaged compressed flexible duct 210 rather than a similar flexible duct that is axially compressed. In addition, flexible duct is typically packaged in 25 feet to 50 feet lengths when axially compressed. With the packaged compressed flexible duct 210, flexible duct may be packaged in greater lengths, including 100 feet, 125 feet, 150 feet, 200 feet, or any length between 25 feet and 200 feet. The reduction in volume can reduce shipping and storage costs of the flexible duct. In addition, radial compression and rolling of the insulating layer 260 reduces the compression ratio of the insulating layer 260 when compared to an axially compressed flexible duct, thereby reducing the potential to damage the insulating layer 260.

Figure 7:
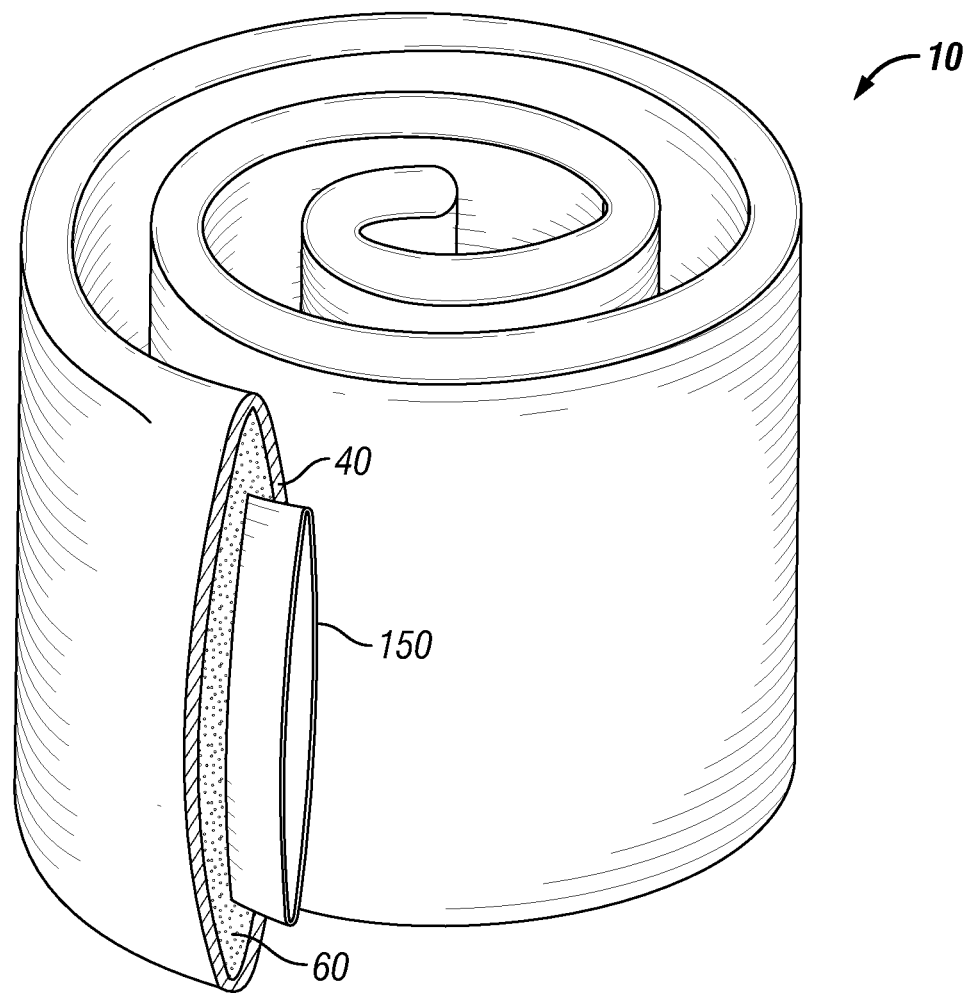
FIG. 7 illustrates a perspective view of a radially compressed sleeve rolled up.

After the packaged compressed flexible duct 200, 210 illustrated in FIG. 7 or 8 is transported to a destination, the final step of assembling the flexible duct 10, 210 is to unflatten the air core 50 radially inside of the insulating layer 60. As part of completing assembly of the flexible duct 10, the flattened air core 50 is inserted into an open end of the shuttle bag 150, if it has not already been. Further, if both ends of the shuttle bag 150 are closed, one end is opened. The closed end of the shuttle bag 150 can be pressurized when a pressurized air flow is applied through the open end.

Further, the holes 152 through the shuttle bag 150 allow air to flow from inside out of the shuttle bag 150. The holes 152 reduce pressure on the closed end of the shuttle bag 150 to control movement of the shuttle bag 150 when it is pressurized. In addition, the holes 152 allow an air flow to flow from within the shuttle bag 150 to within the central cavity of the insulating layer to inflate the central cavity and the insulating layer 60 during insertion of the air core 50.

Figure 9:
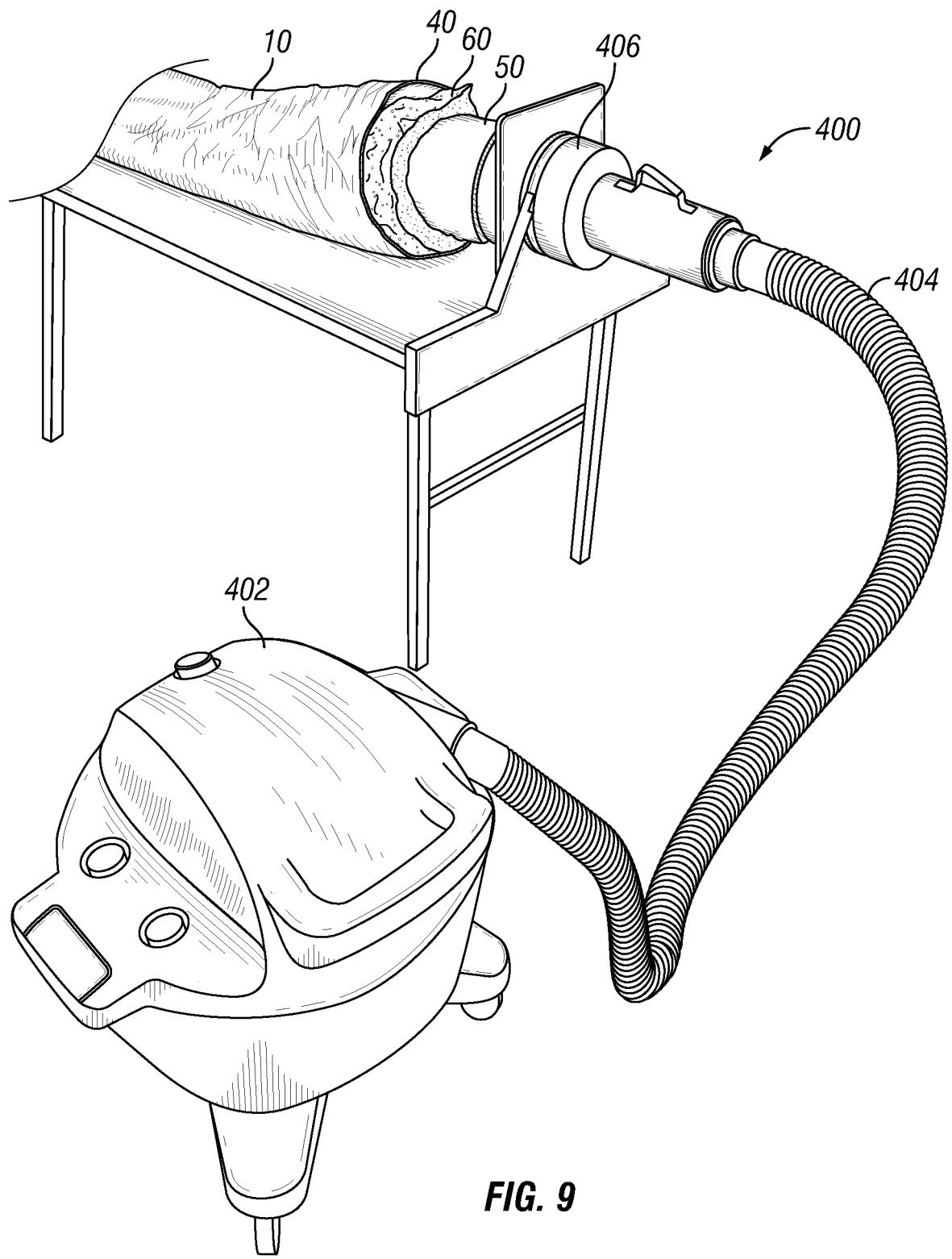
FIG. 9 illustrates a perspective view of a system for assembling a compressed flexible duct.

FIG. 9 illustrates an inflating system 400 for assembly of the flexible duct 10, 210. After placing the air core 50 in the shuttle bag 150, if not already, the closed end of the shuttle bag 150 is placed into the cavity of the insulating layer 60 such that the shuttle bag 150 is fully inside of the insulating layer 60. A portion of the air core 50 is connected to the inflating system 400. For example, the air core 50 can include a hook and loop connector that mates to a matching hook and loop connector on the inflating system 400. The insulating layer 60 and the vapor barrier 40 are also connected to the inflating system 400.

The inflating system 400 includes an air blower 402, a hose 404, and a connector 406. The air blower 402 produces a pressurized air flow that flows through the hose 404, then through the connector 406, and into the air core 50. However, the hose 404 and the air core 50 may have different inner diameters. Accordingly, the connector 406 is used to mate the different inner diameters of the hose 404 and the air core 50 without allowing air to leak out in undesired locations or to cause a pressure drop before the pressurized air from the air blower 402 reaches the air core 50. Thus, the connector 406 includes a radially extended portion to match the inner diameter of the air core 50 and a radially retracted portion to match the inner diameter of the hose 404.

Figure 10:
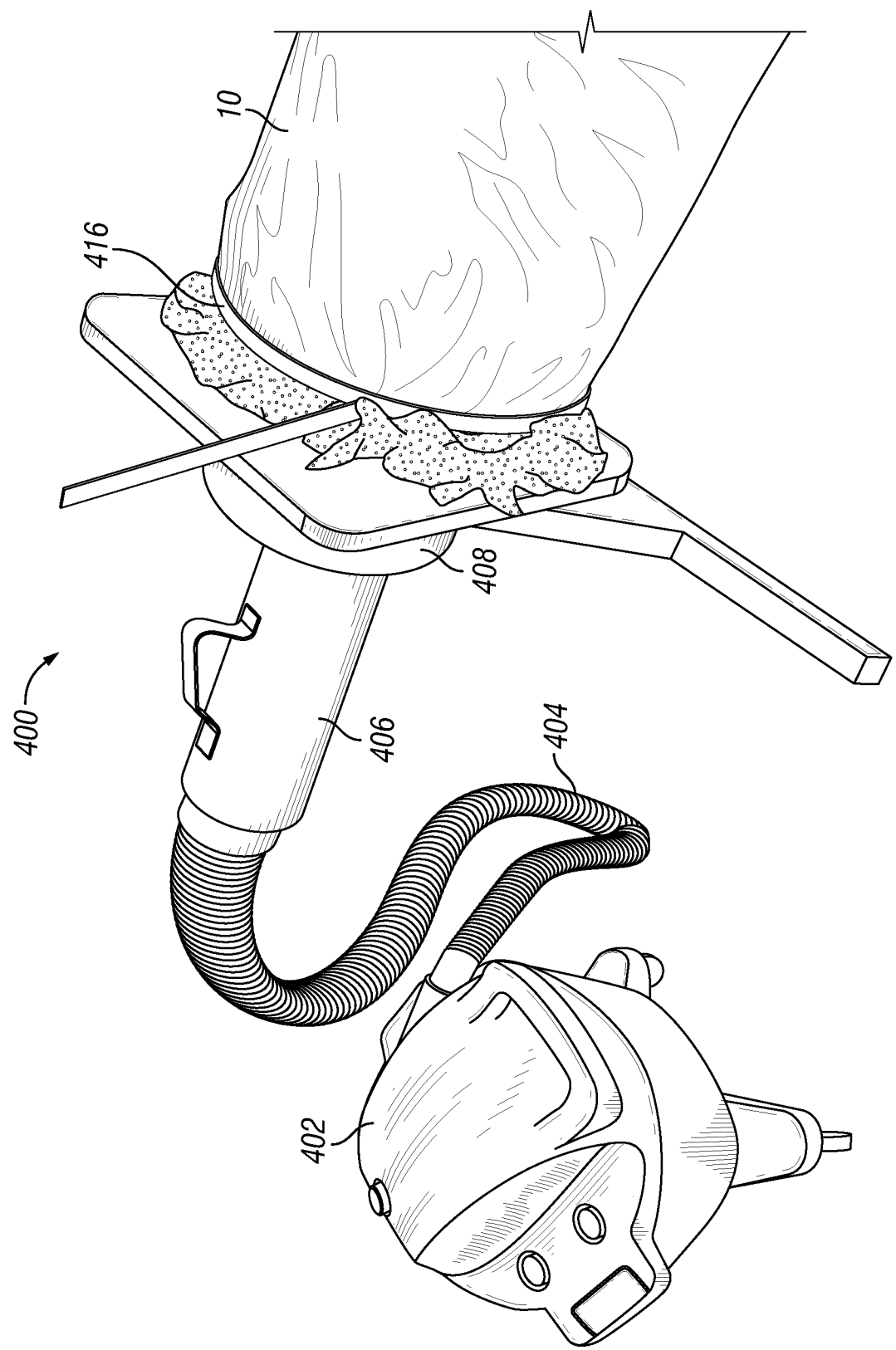
FIG. 10 illustrates a perspective view of a securing mechanism utilized in the system of FIG. 9.

FIG. 10 illustrates how the inflating system 400 and the flexible duct 10, 210 remain secure during operation. The inflating system 400 is secured at the connector 406 to a static member 410, such as a table or other elevated surface, via a securing mechanism 408. The securing mechanism 408 can include screws, bolts, brackets, welds, or any other mechanism to secure the connector 406 to the static member 410. A latching mechanism 416 is utilized to removably couple the flexible duct 10 to the connector 406. Before operating the inflating system 400, all three layers of the flexible duct 10, the air core 50, the insulating layer 60, and the vapor barrier 40, are secured to the connector 406 via the latching mechanism 416. Further, the shuttle bag 150 is not secured to the connector 406 and is left unsecured and radially between the air core 50 and the insulating layer 60. Because the flexible duct 10 is only connected to the inflation system 400 during assembly, the latching mechanism 416 is operable to quickly secure and unsecure the flexible duct 10 to the connector 406. As such, the latching mechanism 416 can include devices such as zip ties or latches.

Figure 11:
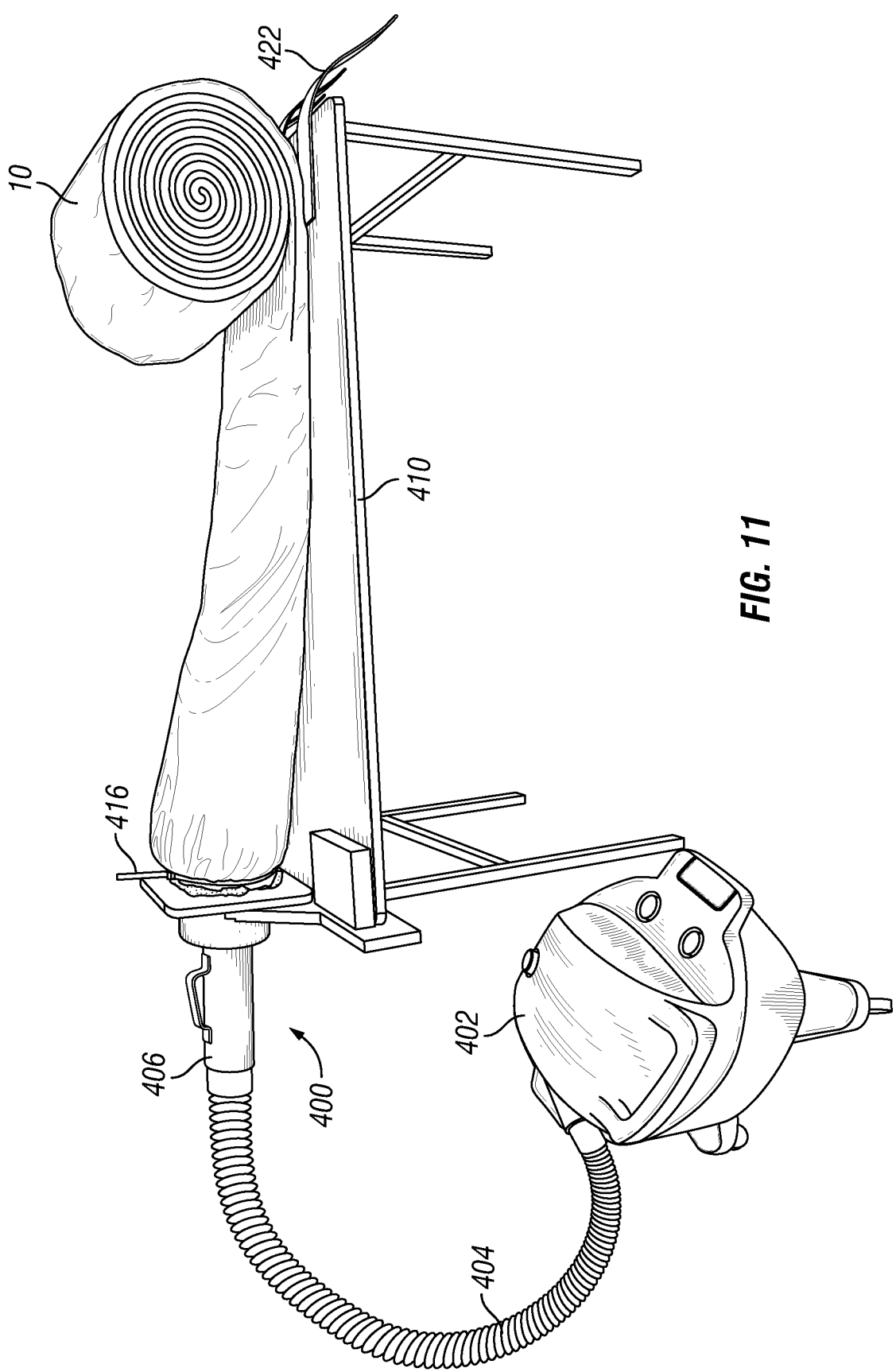
FIG. 11 illustrates a perspective view of the system of FIG. 9 with the flexible duct in a partially uncompressed state.

FIG. 11 illustrates the flexible duct 10, 210 secured to the inflating system 400 while the flexible duct 10, 210 is still in a partially compressed state. The flexible duct 10, 210 is still rolled and placed on the static member 410, which is elevated above a ground level. Once the flexible duct 10, 210 is secured to the inflating system 400, the air blower is operated to provide pressurized air to the flexible duct 10, 210 to complete assembly of the flexible duct 10, 210. The pressurized air is provided to the interior of the air core 50, which causes, at least in part, a force against the rolled portion of the flexible duct 10, 210 to inflate the flexible duct 10, 210 and cause the flexible duct 10, 210 to unroll. In addition, the pressurized air flows through the air core 50 and against the shuttle bag 150, which also provides a force against the rolled portion of the flexible duct 10, 210 to bias the flexible duct 10 to unroll. Gravity may also be used to supplement the above forces to unroll the flexible duct 10. For example, the flexible duct 10 is placed on the static member 410 which is raised above a ground level. Thus, when the flexible duct 10 begins to unroll, it rolls off the edge of the static member 410 down to the ground level. When using the gravity assist, the static member 410 can include ramps 422 to guide the flexible duct to the ground level so that the drop is not as abrupt and the flexible duct 10, 210 unrolls a greater distance between the static member 410 and the ground level.

Further, as described above, compression of the insulating layer 60 reduces the amount of air present in the insulating layer 60. As the pressurized air flows through the shuttle bag 150, the air flows out the holes 152 and into the central cavity of the insulating layer 60, thereby entering into and re-inflating the insulating layer 60 to an uncompressed state.

While the flexible duct 10, 210 unrolls, the shuttle bag 150 remains over at least a portion of the air core 50 and acts to maintain air pressure within the air core 50. Thus, in addition to inflating the sleeve 100, the air pressure also causes the air core 50 to move to an unflattened position. The movement to the un-flattened position is done as the shuttle bag 150 moves axially through the sleeve 100, which is caused by the pressurized air. Further, as shuttle bag 150 moves axially through the sleeve 100, the shuttle bag 150 alone or in combination with the pressurized air also extends the air core 50 axially through the sleeve 100. Friction of the shuttle bag 150 against the air core 50 and the insulating layer 60 in addition to the rolled portion of the flexible duct 10 blocking the path of the shuttle bag 150 act together to keep the shuttle bag 150 between the air core 50 and the insulating layer 60 until the air core 50 is fully un-flattened.

Figure 12:
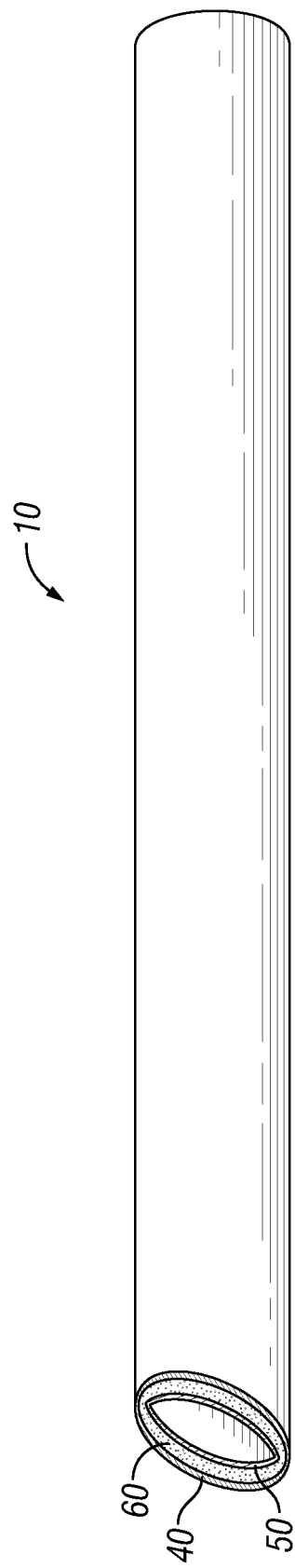
FIG. 12 illustrates a perspective view of the system of FIG. 9 with the flexible duct in a fully uncompressed state.

As inflation continues, the shuttle bag 150 travels axially through the flexible duct 10, 210, and, eventually, is pushed out of the unsecured end of the flexible duct 10, 210 by the pressurized air, leaving only the un-flattened air core 50, the insulating layer 60, and the vapor barrier 40 in a fully assembled state. In instances in which the shuttle bag 150 does not fully exit the flexible duct 10, 210 due to air pressure, an operator can grab the shuttle bag 150 and pull it out of the flexible duct 10, 210. Then, the fully assembled flexible duct 10, 210 is removed from the inflating system 400 and is ready for installation, as illustrated in FIG. 12.

Further examples may include:

Example 1 is a system for packing and assembling a flexible duct that includes a sleeve. The sleeve includes a tubular vapor barrier and an insulating layer within the vapor barrier and includes a central cavity. Further, the sleeve is radially compressed and rolled along an axial direction. The system also includes an air core sized to fit within the central cavity of the insulating layer. The air core includes a sheet that blocks fluid flow therethrough and a structural support coiled within the sheet and the air core is flattenable and not within the rolled sleeve.

In Example 2, the subject matter of Example 1 can further include wherein the air core is flattened and wrapped around the rolled sleeve.

In Example 3, the subject matter of Examples 1-2 can further include wherein the tubular insulating layer and the vapor barrier are at least 25 feet long.

In Example 4, the subject matter of Examples 1-3 can further include a shuttle bag with an open end for receiving the air core and a closed end, wherein the shuttle bag is configured to be radially between the air core and the insulating layer when the air core is inside the shuttle bag and inside the insulating layer.

In Example 5, the subject matter of Example 4 can further include an inflation system comprising an air blower coupleable to the air core to provide air flow to the air core when the air core is inside the shuttle bag during assembly of the flexible duct.

In Example 6, the subject matter of Examples 1-5 can further include wherein the structural support is transitionable between an un-flattened shape and a flattened shape.

Example 7 is a method for compressing a flexible duct. The method includes coupling a vapor barrier to a radially outer portion of an insulating layer. In addition, the method includes radially compressing a sleeve comprising an insulating layer within a vapor barrier. Further, the method includes rolling the compressed vapor barrier and the insulating layer along an axial direction. Moreover, the method includes flattening an air core with a tubular sheet and a structural support coiled within the tubular sheet, wherein the air core is sized to fit within a central cavity of the insulating layer In Example 8, the subject matter of Example 7 can further include flattening the structural support to flatten the air core.

In Example 9, the subject matter of Example 8 can further include wherein flattening comprises passing the air core between two rollers.

In Example 10, the subject matter of Example 8 can further include wrapping the flattened air core around the rolled sleeve.

In Example 11, the subject matter of Example 10 can further include inserting the flattened air core into a shuttle bag and placing the flattened air core and shuttle bag and rolling up with the sleeve or wrapping the flattened air core around the rolled sleeve.

In Example 12, the subject matter of Example 8 can further include wherein flattening the structural support causes inelastic deformation of the structural support.

In Example 13, the subject matter of Examples 7-12 can further include stacking multiple cylinders in a shipping container.

In Example 14, the subject matter of Examples 7-12 can further include transporting the rolled compressed vapor barrier and insulating layer as well as the flattened air core.

Example 15 is a method for assembling a radially compressed flexible duct that includes partially unrolling a sleeve that includes an insulating layer within a vapor barrier In addition, the method includes expanding a flattened air core within a shuttle bag into radial engagement with the insulating layer by providing a pressurized stream of air into the air core to unroll the sleeve and expand the air core into the unrolled flexible duct in an un-flattened position to assemble the flexible duct.

In Example 16 the subject matter of Example 15 can further include wherein the flattened air core transitions to an un-flattened state as the shuttle bag travels axially along the insulating layer.

In Example 17, the subject matter of Examples 15-16 can further include flowing the pressurized stream of air out of the shuttle bag through holes in the shuttle bag.

In Example 18, the subject matter of Examples 15-17 can further include radially decompressing the insulating layer as the flattened air core transitions to an un-flattened state.

In Example 19, the subject matter of Examples 15-18 can further include unrolling the flexible duct as the flattened air core is transitioned to the un-flattened position.

In Example 20, the subject matter of Examples 15-19 can further include unrolling the flexible duct from an elevated position to a lower position to utilize gravity to assist in unrolling.

One or more specific embodiments of the system and method for centralizing a tool in a borehole have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A system for packing and assembling a flexible duct, comprising:
   a sleeve comprising:
      a tubular vapor barrier;
      an insulating layer within the vapor barrier and comprising a central cavity; and
      wherein the sleeve is radially compressed and rolled along an axial direction;
   an air core sized to fit within the central cavity of the insulating layer, the air core comprising a sheet configured to block fluid flow therethrough and a structural support coiled within the sheet and wherein the air core is flattenable and not within the rolled sleeve; and
   a shuttle bag with an open end for receiving the air core and a closed end, wherein the shuttle bag is sized to be placed radially between the air core and the insulating layer when the air core is inside the shuttle bag and inside the insulating layer.

2. The system of claim 1, wherein the air core is flattened and wrapped around the rolled sleeve.

3. The system of claim 1, wherein the insulating layer and the vapor barrier are at least 25 feet long.

4. The system of claim 1, further comprising an inflation system comprising an air blower coupleable to the air core and operable to provide air flow to the air core when the air core is inside the shuttle bag during assembly of the flexible duct.

5. The system of claim 1, wherein the structural support is transitionable between an un-flattened shape and a flattened shape.

6. The system of claim 1, wherein the flexible duct has an R value of R-4.2, R-6.0, R-8.0, R-12.0, or R-13.0.

7. A method for compressing a flexible duct comprising:
radially compressing a sleeve comprising an insulating layer within a vapor barrier;
rolling the compressed vapor barrier and insulating layer along an axial direction;
flattening an air core comprising a tubular sheet and a structural support coiled within the tubular sheet, wherein the air core is sized to fit within a central cavity of the insulating layer, wherein the air core is flattened by flattening the structural support; and
wrapping the flattened air core around the rolled sleeve.

8. The method of claim 7, wherein flattening comprises passing the air core between two rollers.

9. The method of claim 7, further comprising inserting the flattened air core into a shuttle bag and placing the flattened air core and shuttle bag and rolling up with the sleeve or wrapping the flattened air core around the rolled sleeve.

10. The method of claim 7, wherein flattening the structural support causes inelastic deformation of the structural support.

11. The method of claim 7, further comprising stacking multiple cylinders in a shipping container.

12. The method of claim 7, further comprising transporting the rolled compressed vapor barrier and insulating layer as well as the flattened air core.

13. The method of claim 7, wherein the flexible duct has an R value of R-4.2, R-6.0, R-8.0, R-12.0, or R-13.0.

14. A method for assembling a flexible duct comprising:
partially unrolling a sleeve that comprises an insulating layer within a vapor barrier;
expanding a flattened air core within a shuttle bag into radial engagement with the insulating layer by providing a pressurized stream of air into the air core to unroll the sleeve and expand the air core into the unrolled flexible duct in an un-flattened position to assemble the flexible duct, wherein the flattened air core transitions to an un-flattened state as the shuttle bag travels axially along the insulating layer; and
flowing the pressurized stream of air out of the shuttle bag through holes in the shuttle bag.

15. The method of claim 14, further comprising radially decompressing the insulating layer as the flattened air core transitions to an un-flattened state.

16. The method of claim 14, further comprising unrolling the flexible duct as the flattened air core is transitioned to the un-flattened position.

17. The method of claim 16, further comprising unrolling the flexible duct from an elevated position to a lower position to utilize gravity to assist in unrolling.

18. The method of claim 14, wherein the flexible duct has an R value of R-4.2, R-6.0, R-8.0, R-12.0, or R-13.0.

\* \* \* \* \*